(12) United States Patent
Montanari

(10) Patent No.: US 9,517,387 B2
(45) Date of Patent: Dec. 13, 2016

(54) GYMNASTIC TOOL, APPARATUS AND METHOD TO CARRY IT OUT

(71) Applicant: Trial S.r.l., Forli (FC) (IT)

(72) Inventor: Giovanni Montanari, Forli (IT)

(73) Assignee: Trial S.r.l. (IT)

( * ) Notice: Subject to any disclaimer, the term of this patent is extended or adjusted under 35 U.S.C. 154(b) by 163 days.

(21) Appl. No.: 14/600,540

(22) Filed: Jan. 20, 2015

(65) Prior Publication Data

US 2015/0133270 A1 May 14, 2015

Related U.S. Application Data

(62) Division of application No. 13/383,799, filed as application No. PCT/EP2010/060920 on Jul. 27, 2010, now Pat. No. 8,944,962.

(30) Foreign Application Priority Data

Jul. 28, 2009 (IT) .............................. BO2009A0495

(51) Int. Cl.
| | |
|---|---|
| *A63B 26/00* | (2006.01) |
| *A63B 23/14* | (2006.01) |
| *A63B 23/16* | (2006.01) |
| *A63B 43/00* | (2006.01) |
| *A63B 21/00* | (2006.01) |

(Continued)

(52) U.S. Cl.
CPC ......... *A63B 43/002* (2013.01); *A63B 21/0004* (2013.01); *A63B 41/00* (2013.01); *A63B 41/085* (2013.01); *A63B 45/02* (2013.01); *B29C 41/04* (2013.01); *B29C 41/20* (2013.01); *B29D 22/00* (2013.01); *A63B 43/04* (2013.01); *A63B 2225/62* (2013.01); *B29L 2031/52* (2013.01)

(58) Field of Classification Search
CPC ....... A63B 43/002; A63B 45/02; A63B 41/00; A63B 41/085; A63B 21/0004; A63B 2225/62; A63B 43/04; B29C 41/20; B29C 41/04; B29D 22/00; B29L 2031/52
USPC ....... 482/23, 44–50, 92, 111, 112, 131, 142; 473/569, 593, 595–599, 603, 604, 609, 473/610, 611, 614; D21/707, 712, 713
See application file for complete search history.

(56) References Cited

U.S. PATENT DOCUMENTS

| D21,060 S | * | 9/1891 | Amselem ...................... 473/575 |
| 1,531,317 A | * | 3/1925 | Stubbs ................... A63B 39/00 |
| | | | 152/317 |

(Continued)

FOREIGN PATENT DOCUMENTS

| CA | 2410704 A1 | 5/2004 |
| DE | 29707658 U1 | 7/1997 |

(Continued)

OTHER PUBLICATIONS

Italian Search Report, for IT BO20090495, dated Mar. 17, 2010, two (2) pages.

(Continued)

*Primary Examiner* — Stephen Crow
*Assistant Examiner* — Garrett Atkinson
(74) *Attorney, Agent, or Firm* — Ware, Fressola, Maguire & Barber LLP

(57) ABSTRACT

A gymnastic tool (1) is formed by at least two impermeable external walls (2, 3) which are each concave shaped and provided with respective edges (4,5). The at least two impermeable walls (2, 3) are mutually fixed together by a connector (6), the gymnastic tool having at least one inner cavity.

16 Claims, 9 Drawing Sheets

(51) Int. Cl.
*A63B 41/00* (2006.01)
*A63B 41/08* (2006.01)
*B29C 41/04* (2006.01)
*B29C 41/20* (2006.01)
*B29D 22/00* (2006.01)
*A63B 45/02* (2006.01)
*A63B 43/04* (2006.01)
*B29L 31/52* (2006.01)

(56) References Cited

U.S. PATENT DOCUMENTS

| | | | | |
|---|---|---|---|---|
| 1,771,861 A * | 7/1930 | Penfold | | B29D 22/04 |
| | | | | 156/213 |
| 1,964,008 A * | 6/1934 | Roberts | | A63B 39/00 |
| | | | | 267/35 |
| 2,078,382 A | 4/1937 | Hanshaw | | |
| 2,244,503 A * | 6/1941 | Riddell | | A63B 41/08 |
| | | | | 473/597 |
| 2,521,703 A * | 9/1950 | Emmitt | | A63B 41/00 |
| | | | | 273/146 |
| 2,621,334 A * | 12/1952 | O'Hare | | A42B 1/006 |
| | | | | 2/171.01 |
| 2,935,320 A * | 5/1960 | Chupa | | F16K 15/202 |
| | | | | 137/323 |
| 3,040,384 A | 6/1962 | Whittington | | |
| 3,119,617 A * | 1/1964 | Topper | | A63B 41/12 |
| | | | | 473/593 |
| 3,165,565 A | 1/1965 | Cox et al. | | |
| 3,664,401 A | 5/1972 | Travati | | |
| 3,863,923 A * | 2/1975 | Anderson | | A63B 39/06 |
| | | | | 40/327 |
| 4,340,222 A * | 7/1982 | Kerkenbush | | A63B 41/10 |
| | | | | 264/328.1 |
| 5,045,011 A * | 9/1991 | Lovik | | A63H 33/18 |
| | | | | 273/114 |
| 5,098,095 A * | 3/1992 | Weiss | | A63B 41/12 |
| | | | | 446/220 |
| D340,489 S * | 10/1993 | Evangelista | | D21/713 |
| 5,286,020 A * | 2/1994 | Caruso | | A63B 41/00 |
| | | | | 473/603 |
| 5,342,268 A * | 8/1994 | Caruthers | | A63B 21/0605 |
| | | | | 482/106 |
| D351,203 S * | 10/1994 | Handy | | D21/707 |
| 5,709,623 A * | 1/1998 | Schwaner | | A63B 41/08 |
| | | | | 473/604 |
| 5,890,999 A * | 4/1999 | Kildani | | A63B 21/00189 |
| | | | | 482/121 |
| 5,941,785 A * | 8/1999 | Bartels | | A63B 41/085 |
| | | | | 473/596 |
| 6,123,633 A * | 9/2000 | Guenther | | A63B 41/08 |
| | | | | 473/596 |
| 6,228,001 B1 * | 5/2001 | Johnson | | A63B 21/028 |
| | | | | 482/44 |
| 6,422,960 B1 * | 7/2002 | Touhey | | A63B 41/00 |
| | | | | 473/593 |
| 6,491,595 B1 * | 12/2002 | Feeney | | A63B 41/00 |
| | | | | 473/593 |
| 6,575,855 B1 * | 6/2003 | Buzak | | A63B 43/06 |
| | | | | 273/DIG. 8 |
| D478,947 S * | 8/2003 | Lu | | D21/662 |
| 6,629,908 B2 * | 10/2003 | Hamady | | A63B 21/222 |
| | | | | 482/110 |
| 6,663,520 B2 * | 12/2003 | Ou Chen | | A63B 41/00 |
| | | | | 473/604 |
| 6,966,857 B2 * | 11/2005 | Kennedy, III | | A63B 41/12 |
| | | | | 473/593 |
| 7,175,573 B1 * | 2/2007 | Huang | | A63B 21/0004 |
| | | | | 446/236 |
| D571,874 S * | 6/2008 | Krysiak | | D21/712 |
| 8,454,483 B1 * | 6/2013 | Bradley | | A63B 21/072 |
| | | | | 482/44 |
| 2004/0048720 A1 * | 3/2004 | Kuo | | A63B 21/22 |
| | | | | 482/45 |
| 2006/0035763 A1 * | 2/2006 | Patterson | | A63B 21/0601 |
| | | | | 482/93 |
| 2006/0063653 A1 * | 3/2006 | Wickens | | A63B 41/00 |
| | | | | 482/142 |
| 2006/0205544 A1 * | 9/2006 | Wyner | | A63B 41/00 |
| | | | | 473/569 |
| 2007/0178997 A1 * | 8/2007 | Chang | | A63B 41/02 |
| | | | | 473/603 |
| 2007/0225133 A1 * | 9/2007 | Castro | | A63B 21/0004 |
| | | | | 482/140 |
| 2007/0259761 A1 * | 11/2007 | Lin | | A63B 26/00 |
| | | | | 482/142 |
| 2008/0064540 A1 * | 3/2008 | Chen | | A63B 41/00 |
| | | | | 473/604 |
| 2008/0305900 A1 * | 12/2008 | Geisendorfer | | A63B 41/08 |
| | | | | 473/596 |
| 2010/0285931 A1 * | 11/2010 | Heller | | A63B 22/18 |
| | | | | 482/92 |
| 2013/0190113 A1 * | 7/2013 | Bevier | | A63B 41/08 |
| | | | | 473/604 |

FOREIGN PATENT DOCUMENTS

DE 19715621 A1 10/1998
GB 702174 A 1/1954
WO WO2007/035776 A 3/2007

OTHER PUBLICATIONS

International Search Report, for PCT/EP2010/060920, dated Oct. 18, 2010, three (3) pages.

* cited by examiner

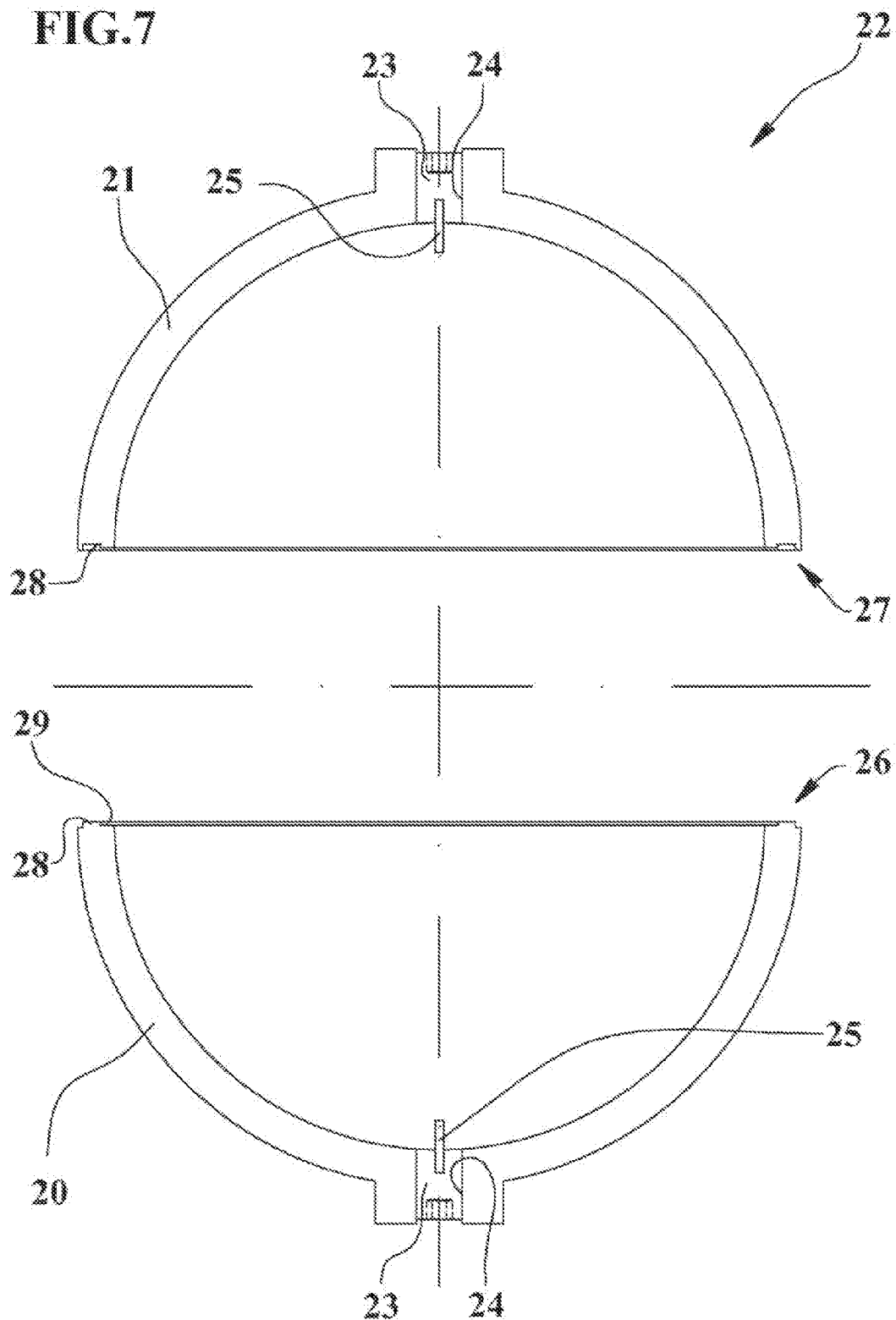

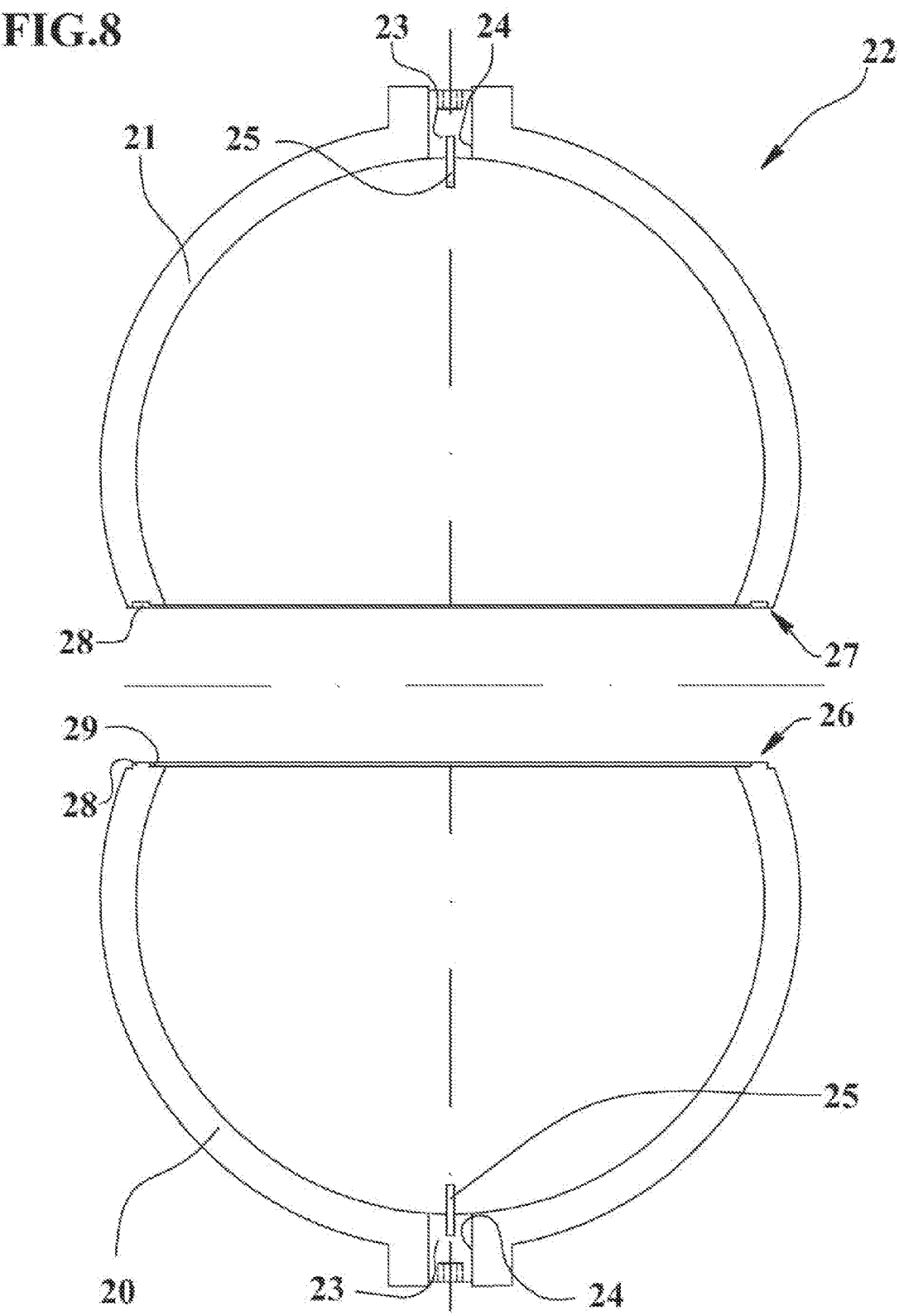

FIG.10
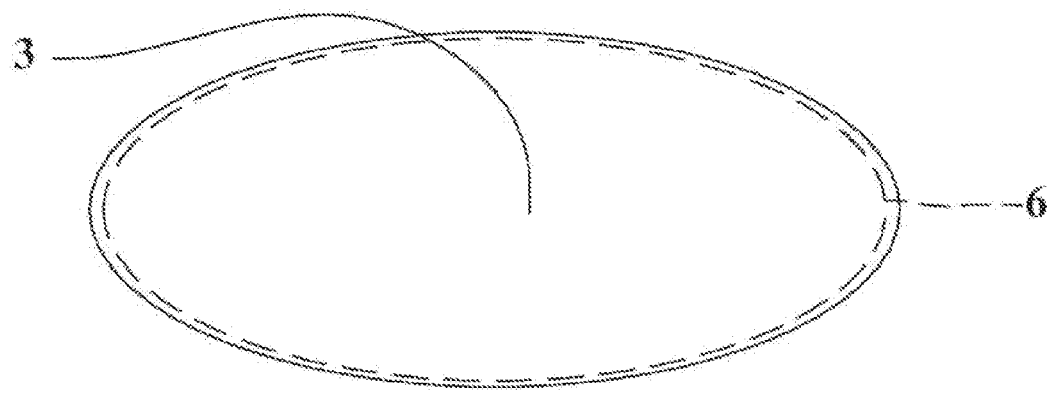
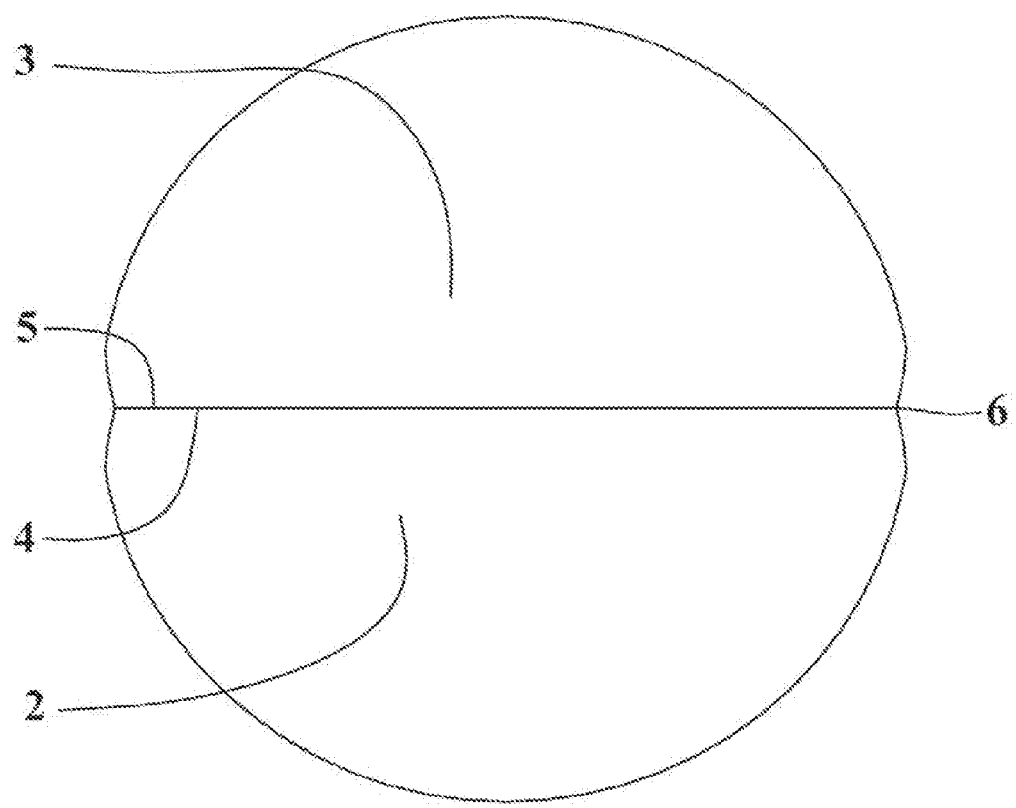
FIG.9

GYMNASTIC TOOL, APPARATUS AND METHOD TO CARRY IT OUT

CROSS REFERENCE TO RELATED APPLICATIONS

This application is a division of U.S. patent application Ser. No. 13/383,799 filed 12 Jan. 2012 which was a national stage of PCT International Patent application no. PCT/EP2010/060920, filed 27 Jul. 2010 which claimed priority in Italian Patent application no. BO2009A 000495, filed 28 Jul. 2009, the contents of these documents incorporated herein by reference.

TECHNICAL FIELD

The present invention relates to the technical field of gymnastic and play apparatus and in particular to a gymnastic tool suitable for use during aerobic exercises, for training the equilibrium and coordination, for rehabilitation and in a similar way is suitable for clearance and to use for recreation.

BACKGROUND OF THE INVENTION

There are known gymnastic and play devices consisting of balloons made of flexible or elastic material whose forms are assured by an over-pressure of the internal air. The known devices are fit for many exercises and games but they are limited by their spherical shape and by their balancing.

DISCLOSURE OF THE INVENTION

An object of the present invention is to propose a gymnastic tool which is very resistant and has symmetrical shapes different from the spherical shapes and can be shaped in almost an infinite variety of forms.

Another object is to propose a gymnastic tool which can be ballasted, with liquids, powders or other materials, so that the barycentre can be moved in respect with the geometric centre and eventually that said barycentre can move in an almost random manner.

A further object is to propose a gymnastic tool which allows new and efficacious training and rehabilitating exercises and which is also amusing.

Another object is to propose an apparatus as well as a method to carry out said apparatus in a simple and economic manner.

DESCRIPTION OF THE DRAWINGS

The characteristics of the invention are evidenced in the following with particular reference to the attached drawings, in which:

FIG. 7 shows a section view of two separate elements of a mould of the apparatus, object of the present invention, to carry out the gymnastic tool;

FIG. 8 shows a variant of the mould of FIG. 7;

FIGS. 9 and 10 respectively show a side view and a top view of a second variant of the gymnastic tool of FIG. 1;

BEST MODE FOR CARRYING OUT THE INVENTION

Figure 1:
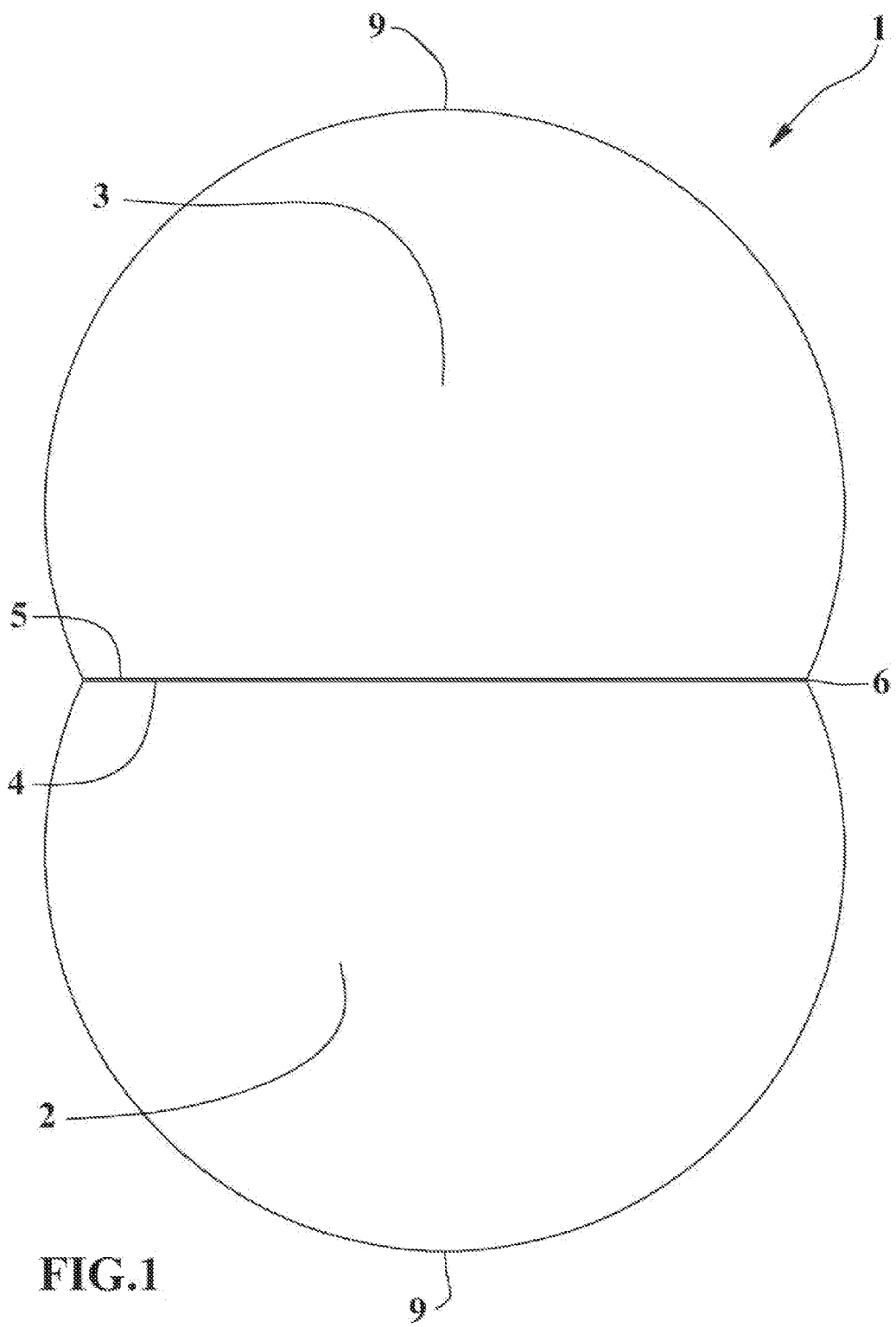
FIG. 1 shows a side-view of the gymnastic tool object of the present invention.
Figure 2:
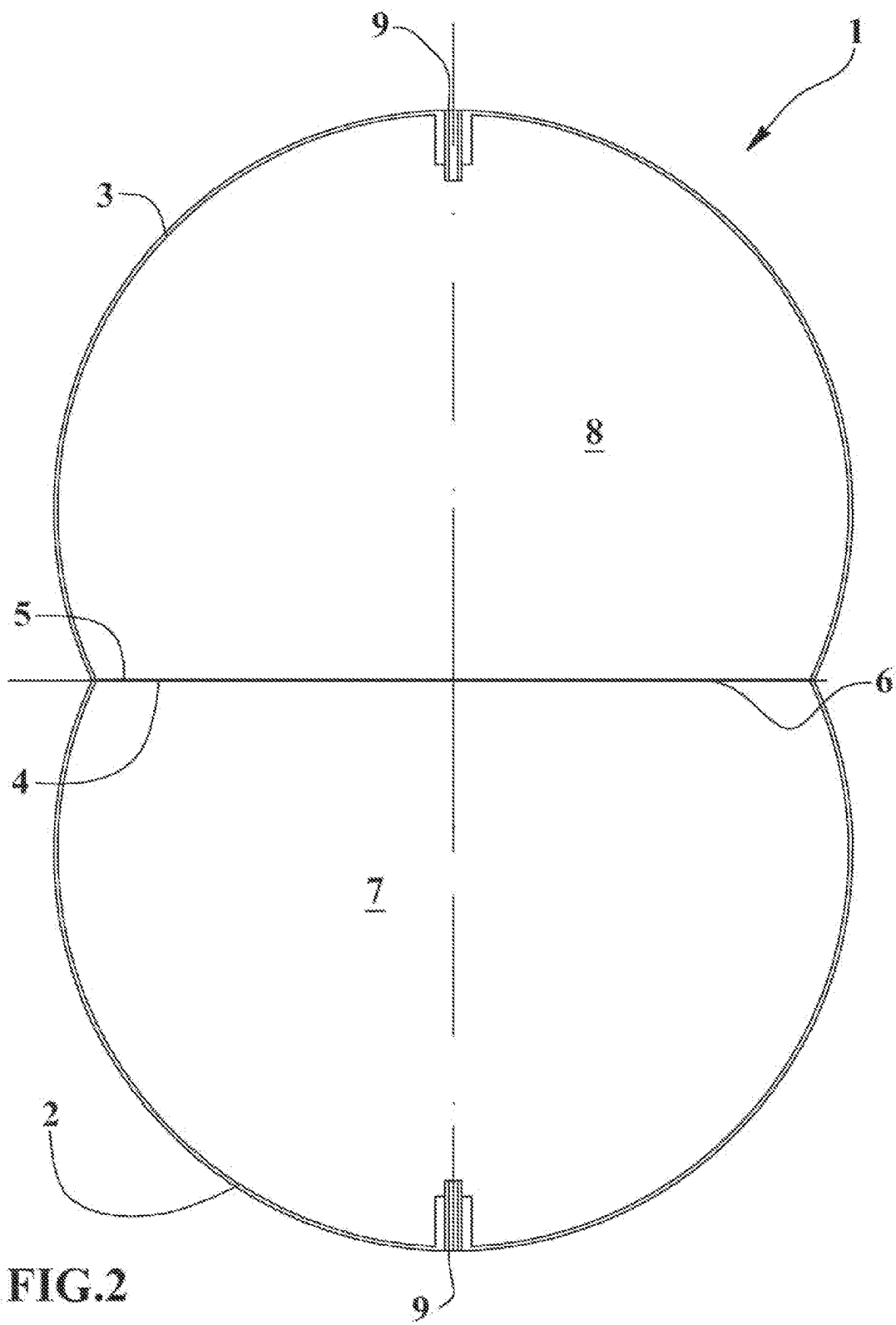
FIG. 2 shows a transversal plane section view of the tool of FIG. 1.
Figure 4:
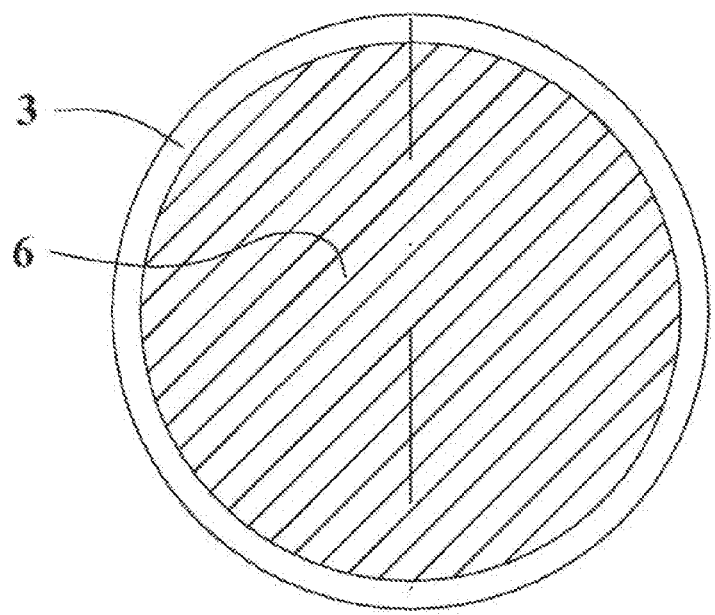
FIGS. 3 and 4 show respectively a reduced view of FIG. 2 and a section view at the plane IV-IV of FIG. 3.
Figure 3:
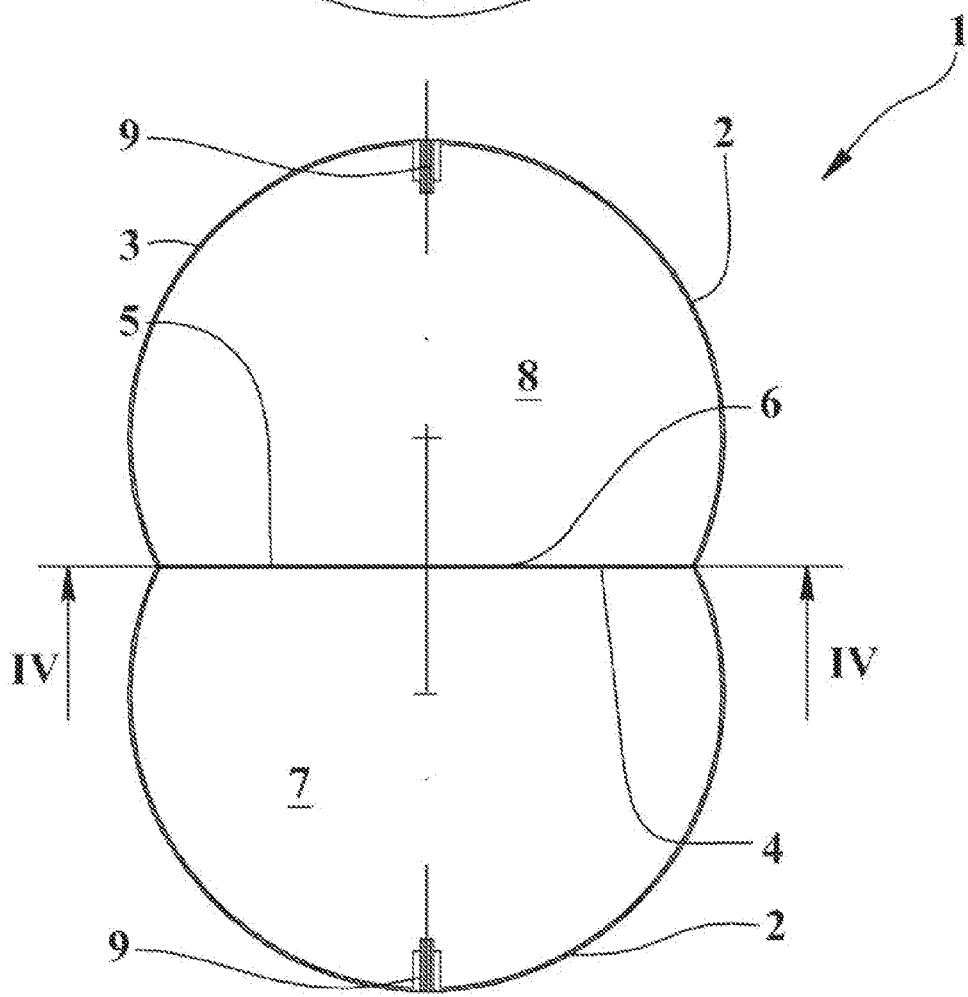

With reference to figures from 1 to 4, numeral 1 indicates the gymnastic tool, which is the object of the present invention, comprising two external walls 2, 3 which are impermeable, each of them being concave shaped and being equipped with respective circular edges 4, 5 fixed mutually by a connecting means 6.

In an operational condition of the tool, the external walls 2, 3 are almost spherical cap shaped, each of them having solid angle bigger than 180°.

In one alternative, the invention provides that one or both caps subtend a solid angle equal to or smaller than 180° and/or and the surface of said caps can be almost spherical or lobe shaped, with sectors, for example similarly to the surface of a peeled citrus, or provided with protrusions or shapes. In case of external walls 2, 3 having lobe shapes or with sectors, the edges 4, 5 obviously are not circular but assume a shaped form for example a daisy shaped form.

The external walls 2, 3 are made of flexible and/or elastic material, for example a non-toxic flexible thermoplastic material after the forming, or a rigid or semi-rigid material. The connecting means 6 consist of an impermeable separator which divides the internal cavity of the tool in two completely separated chambers 7, 8. Said impermeable separator of the connection means is made of flexible plastic material, for example PVC or rigid plastic.

The materials of the external walls and of the separator can be of the plastic type including also the bi-component materials and/or polymerizable materials or mixtures.

The external wall 2, 3 of each separated chamber 7, 8 comprises a valve means 9 of the type fit for gas and liquid, to inflate said walls and for the possible insertion of ballast liquid in one or both of the chambers 7, 8. Each valve means is applied to the respective external wall preferably at a zenithal or azimuthal position.

Each flexible or elastic external wall or else each rigid external wall assumes the spherical cap shape with solid angle bigger than 180° in the operational condition in which the respective chamber 7, 8 has a predetermined pressure respectively bigger or also equal to the environmental pressure.

If one or both external walls of the spherical shaped cap having a solid angle equal to or smaller than 180°, said walls can be made of flexible and elastic material or of rigid material. In particular the tool can assume a lenticular biconvex lens shape with one or both rigid walls.

Figure 6:
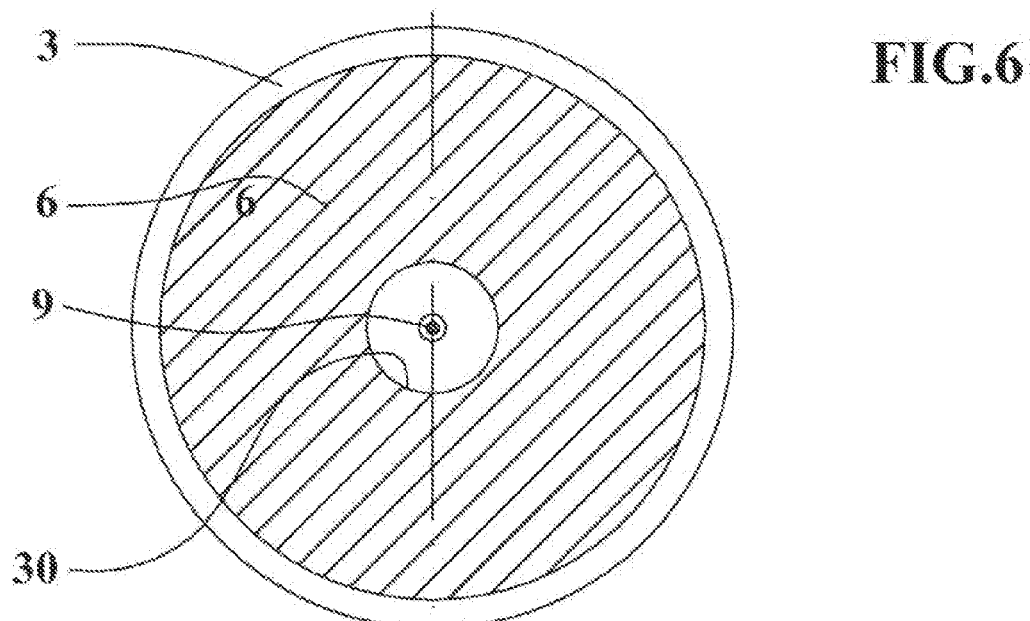
FIGS. 5 and 6 show respectively a section view of a variant of the tool of FIG. 1 and a section view at the plane VI-VI of FIG. 5.
Figure 5:
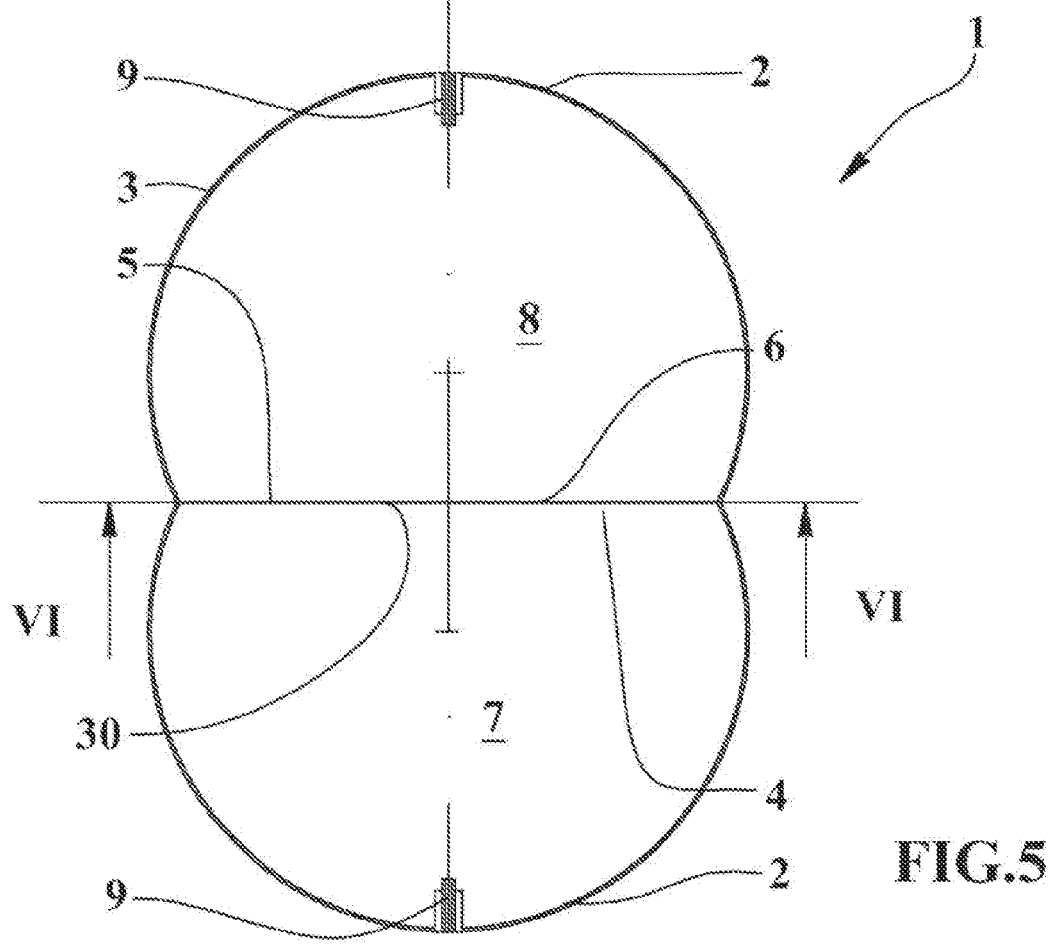

The variant of the tool shown in FIGS. 5 and 6 provides that the connecting means 6 consist of a separator with a centre hole 30 and that this separates the cavity into two communicating chambers. In this variant it is sufficient to have only one valve means.

The variant of the tool shown in FIGS. 9 and 10 provides that the connecting means 6 and the edges 4, 5 of the external walls 2, 3 are not circular but are elliptic shaped, as shown in FIG. 10, or oval, or smoothed triangle shaped or similar.

The shape of this variant allows, for instance, to train the user's balance particularly in the front-back or side directions according to the orientation of the shorter axis of the connecting means 6.

Figure 11:
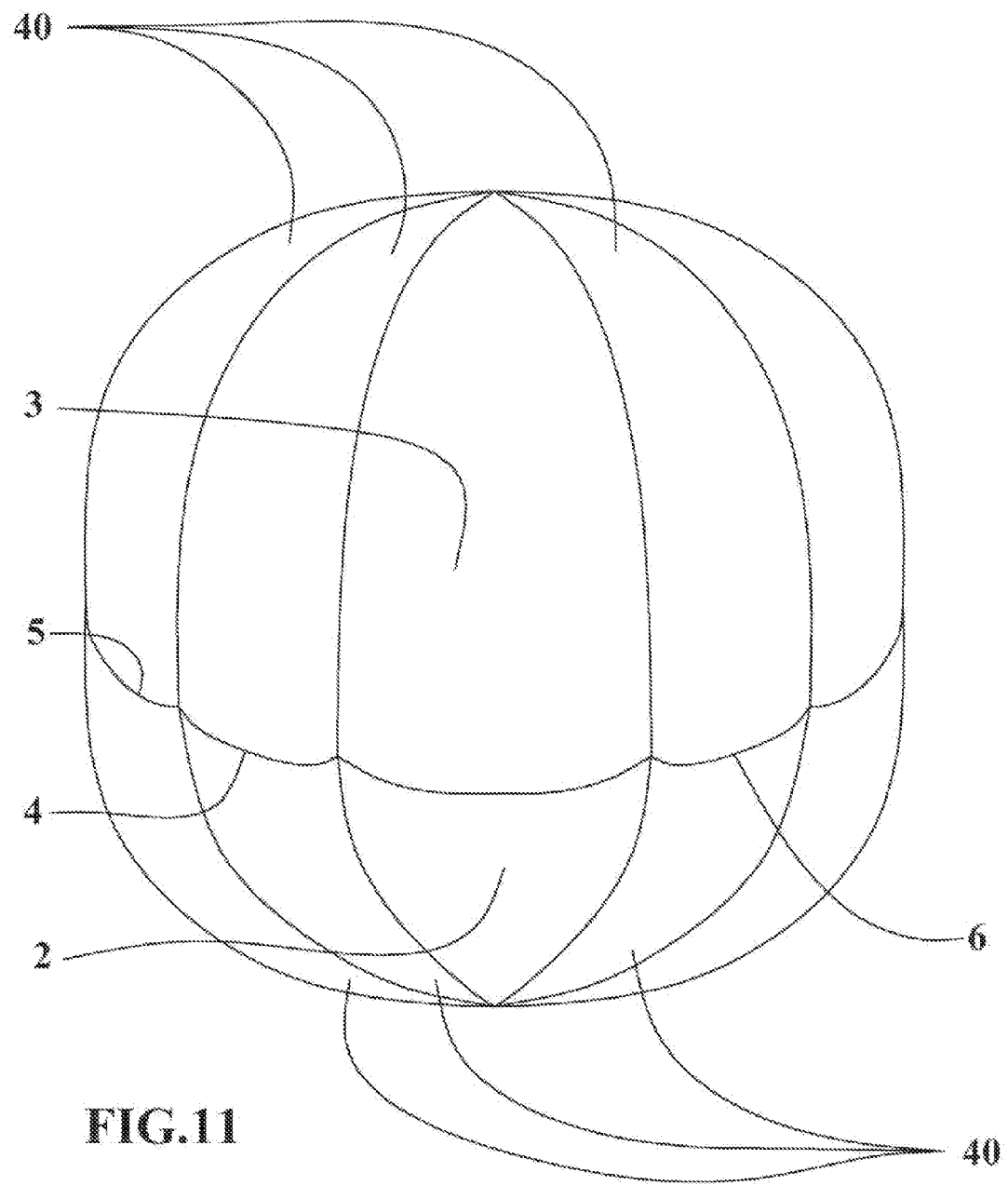
FIGS. 11 and 12 show perspective views of respective further variants of the gymnastic tool of FIG. 1.

In the variant of the tool shown in FIG. 11, the external walls 2, 3 are shaped with protruding meridian lobes 40, similarly to the surface of a peeled citrus. In this variant the edges 4, 5 can be not circular and can assume a daisy like shape. In alternative the external walls 2, 3 can be shaped as protruding parallel lobes, each shaped as an annular portion of a torus. These shapes allow the tool to assume both relatively stable positions in respect to the environment and/or to the user and to assume unstable positions providing a different training. The shape of this variant further provide unexpected reactions and rebounds and it allows user or users to play in original manner.

Figure 12:
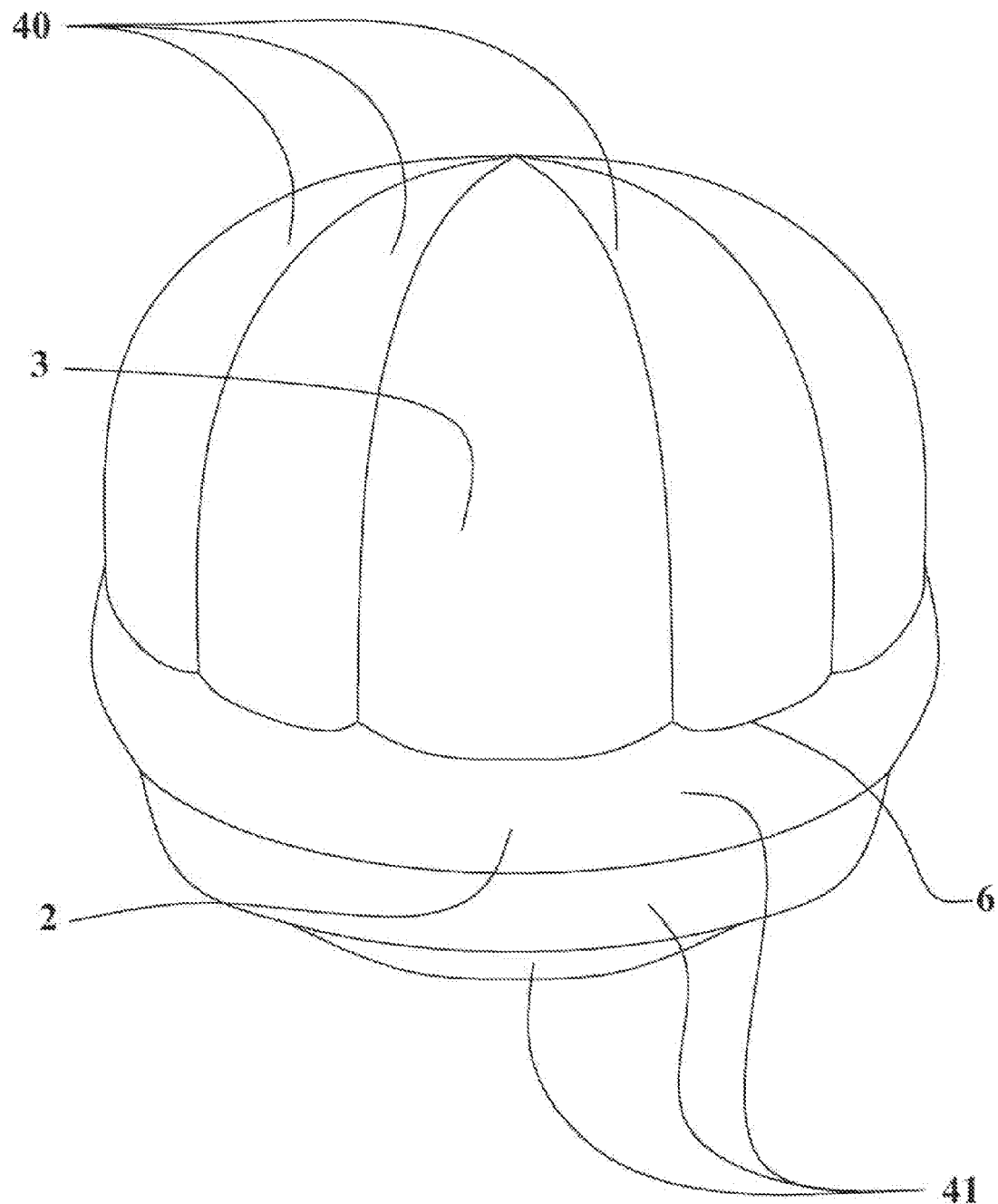

In the variant of the tool shown in FIG. 12, the shapes of the external walls 2, 3 are different, for instance, one 2 is shaped with protruding meridian lobes 40 and the other 3 is shaped as protruding parallel lobes 41. This variant allow the tool to provide further trainings and/or plays and to change the effect thereof simply utilizing an external walls 2 or the other 3.

The invention further provides that one of the two airtight external walls 2 is shaped with protruding meridian lobes 40 or with protruding parallel lobes 41 and the other 3 is spherical cap shaped. This variant allows, for instance, to vary the balance and or the reactions of the tool in respect to the user's actions.

A further simple variant of the tool, which can be understood without asking specific figures, provides that the connecting means are constituted by a annular means almost ring shaped or having thin circular rim. Said annular means is flexible and inextensible.

A further variant not shown provides that the tool is provided with three or more external walls mutually fixed by means of more connecting means 6. In this manner, the tool can have a "sausages" shape with tripod or many others.

The operation of the gymnastic tool provides that it can be ballasted or not and can be manipulated according to predetermined exercise schemas or free manner and/or the game manner. It is also provided that the tool, for example in case it is carried out in lenticular biconvex lens shape, can be used as support partially or totally unstable for the user.

The apparatus for carrying out the gymnastic tool comprises a mould 22 whose elements 20, 21 are schematically shown in the FIG. 7 in a removed away condition.

The apparatus comprises tightening means, which is known and not shown, fit to translate mutually and to tighten the two elements 20, 21 of the mould 22.

The internal face of each element 20, 21 is spherical cap shaped having solid angle equal to or slightly smaller than 180°, with spherical surface or lobe shape, sectors or provided with depressions or shapes.

The elements 20, 21 have, at zenithal and azimuthal position, respective inlets 24 which can be closed and opened by means of respective opening means 23, for example of screw-type.

Each opening means 23 is equipped with supporting means 25 protruding inside the element in the closing condition of the corresponding inlet, and fit to support a valve means, or one connection thereof, to be incorporated into the external walls 2, 3 of the tool.

The edges 26, 27 of the two elements 20, 21 have respective optional register annular means 28 assigned to the perfect mutual alignment of the two elements and eventually to shear, by their sharpened edge not shown, the portion protruding from the connection means.

Said edges 26, 27 can be also equipped with optional annular housing means 29 fit to house the pre-cut edge according to measure of the connecting means 6.

In one alternative, the tightening means can be equipped with a knife to cut the protruding portion of the connecting means.

The variant of the mould of FIG. 8 is different from that of FIG. 7 due to the fact that the two elements 20, 21 of the mould 22 have respective inner faces of spherical cap shape with an angle bigger than 180°. Also in this case the inner surface can be perfectly spherical or lobe shaped sector type or otherwise shaped. Obviously said mould, due to the undercuts, does not render to the use of plastic or resins substances that, at the mounding term, they become rigid.

The operation to carry out the gymnastic tool by means of the above-mentioned apparatus and according to the method object of the present invention comprises the following steps:

to position, by means of the tightening means, the lower member 20 of the mould 22, having the inlet 24 closed by the opening means 23 and spaced apart from the upper member 21 and having the respective edge 26 almost horizontal and oriented upward;

to put a valve means or a connector thereof onto the support means 25 of said opening means 23;

to pour into the lower member 20, through its edge 26, a plastic material of the kind and in the quantity fit for forming the corresponding external wall 2;

to put the connecting means 6 above the edge 26 of the lower member 20 and, if it consists of a separator cut to fit it, to put the edges thereof onto the possible annular housing means 29 of said edge;

by means of the tightening means, to tight the members 20, 21 of the mould 22 clamping the connecting means 6;

to take away the opening means 23 from the inlet 24 of the upper member 21;

if the connecting means 6 consist of an airtight separator, to apply onto the support means 25 of this latter opening means 23 a valve means or a connector thereof;

to pour into the upper member 21, through the respective inlet 24, a plastic material of the kind and in the quantity fit for forming the corresponding external wall 3 and of the same kind or different kind of material poured into the lower member 20;

to close said inlet 24 by means of the opening means 23;

to introduce the mould 22, by means of the tightening means or together with them, into a molding oven for example of heated rotation mould type.

at the end of the heating and of the rotation, to take out the mould 22, to open it and to take out the formed tool;

to perform the possible blowing and/or the possible filling of the chamber 7, 8 or of the inner cavity, through the at least one valve means 9.

The method provides furthermore to use the connecting means 6 consistent in a sheet or in a separator of flexible material, for example of PVC, or rigid material.

The method provides also the steps to use a plastic material for forming of the flexible or elastic external walls 2, 3, for example an elastic thermoplastic non-toxic material after the heat-moldings. It is also provided, in particular but not exclusively when an element 20, 21 internally having spherical cap shape with solid angle smaller than 180°, to use a rigid or semi-rigid plastic material following the molding to form rigid or semi-rigid walls 2, 3 with solid angles smaller or even bigger than 180°.

An advantage of the present invention is to propose a gymnastic tool which is very resistant and has symmetry forms different from the spherical form and can be shaped in an almost infinite variety of forms.

Another advantage is to propose a gymnastic tool which can be ballasted with liquids, powders or other materials, so that the barycentre can be moved in respect with the geometric centre and eventually that said barycentre can move in almost random manner.

Further advantage is to propose a gymnastic tool which allows new and efficacious training and rehabilitating exercises and which is also amusing.

Another advantage is to propose an apparatus as well as a method to carry out said apparatus in a simple and economic manner.

The invention claimed is:

1. A unitary gymnastic tool comprising:
   at least two interior chambers, a first chamber defined by a first impermeable external wall, and a second chamber defined by a second impermeable external wall;
   the first and second external walls having facing edges, a planar connecting wall disposed between the facing edges;
   the planar connecting wall fixing the respective edges together so as to make the external walls inseparable, the fixed first impermeable external wall and second external wall forming the unitary gymnastic tool;
   wherein at least the first impermeable exterior wall is in the form of a truncated sphere having a circumferential angle greater than 180° and less than 360°; and,
   wherein the planar connecting wall partitions the first chamber from the second chamber, the planar connecting wall having a central hole wherein the two chambers are in fluid communication via the central hole, and wherein the area of the connecting wall is greater than the area of the central hole.

2. The unitary gymnastic tool according to claim 1 wherein the planar connecting wall and the edges of the two impermeable external walls have a circular, elliptical, oval or smoothed triangle shape.

3. The unitary gymnastic tool according to claim 1 wherein at least one of the impermeable external walls is made of flexible or resilient material.

4. The unitary gymnastic tool according to claim 1 wherein the planar connecting wall is at least partially flexible or rigid.

5. The unitary gymnastic tool according to claim 1 further comprising at least one valve mounted to at least one impermeable external wall for admitting a fluid to at least one chamber.

6. The unitary gymnastic tool according to the claim 1 wherein at least one chamber thereof is under a predetermined pressure greater than a pressure of the environment.

7. The unitary gymnastic tool according to claim 1 wherein the second external impermeable wall is shaped to have protruding meridian lobes.

8. The unitary gymnastic tool according to claim 1 wherein the second external impermeable wall is shaped to have protruding parallel lobes, each lobe being an annular portion of a torus.

9. The unitary gymnastic tool according to claim 1 wherein the two impermeable external walls have substantially identical shapes.

10. The unitary gymnastic tool according to claim 1 wherein the second impermeable external wall has a shape different from the first impermeable external wall shape.

11. The unitary gymnastic tool according to claim 1 wherein the second impermeable external wall is shaped to have protruding meridian lobes.

12. The unitary gymnastic tool according to claim 1 wherein the second impermeable external wall is shaped to have protruding parallel lobes.

13. An apparatus for producing the gymnastic tool of claim 1 comprising:
    a mould tightener which mutually translates and tightens at least two members of a mould where the inner face of at least one mould member is shaped in a form of a truncated sphere having a circumferential angle greater than 180° and less than 360°;
    at least one of the mould members having in a zenith or azimuth position, with an opening plug for opening and closing an inlet of the respective mould member;
    said opening plug having a support protruding inward of the mould member when in a closed condition, for supporting a valve to be embedded into the external wall.

14. The apparatus according to claim 13 wherein projecting edges of the mould members are received in register with respective mating annular recesses, an optional annular housing recess receiving an edge of the planar connecting wall which is sized to fit the annular housing recess.

15. A method for making the gymnastic tool of claim 1 comprising:
    providing a mould tightener which mutually translates and tightens at least two members of a mould where the inner face of at least one mould member is shaped in a form of a truncated sphere having a circumferential angle greater than 180° and less than 360°;
    at least one of the mould members having in a zenith or azimuth position, with an opening plug for opening and closing an inlet of the respective mould member;
    said opening plug having a support protruding inward of the mould member when in a closed condition, for supporting a valve to be embedded into the external wall;
    positioning a lower mould member, having the inlet closed by the opening plug, spaced from an upper mould member and having the respective edge almost horizontal and upward oriented;
    placing a valve or a connector thereof onto the support of said opening plug;
    pouring a plastic material adapted for forming the corresponding external wall, into the lower mould member, through the respective edge;
    placing the planar connecting wall over the edge of the lower member and, if the planar connecting wall consists of a separator sized to fit therein, placing the edges thereof onto an optional annular housing recess for receiving said edge;
    using the mould tightener to tighten the mould members, thereby clamping the planar connecting wall;
    removing the opening plug from the inlet of the upper mould member;
    if the planar connecting wall consists of an airtight separator, applying onto the support of said opening plug a valve or a connector thereof;
    pouring a plastic material adapted forming the corresponding external wall, into the upper mould member, through the respective inlet, said material being either the same or different from the plastic material poured into the lower mould member;
    closing said inlet using the opening plug;
    introducing the mould into a forming oven and simultaneously warming and rotating the mould;
    removing the mould from the forming oven, opening the mould and taking the formed tool out of the mould;

optionally performing a blowing and/or filling of the chambers or inner cavity of the formed tool through the at least one valve.

16. The method according to claim 15 further comprising the steps of:
using a planar connecting wall consisting of a sheet or separator made of a flexible material or a rigid material;
using a flexible or resilient plastic material, or rigid plastic material, for forming the external walls.

* * * * *